Jan. 14, 1936.   A. C. WOOD   2,027,802
PAPER ICE CREAM CUP
Filed June 26, 1933   3 Sheets-Sheet 1
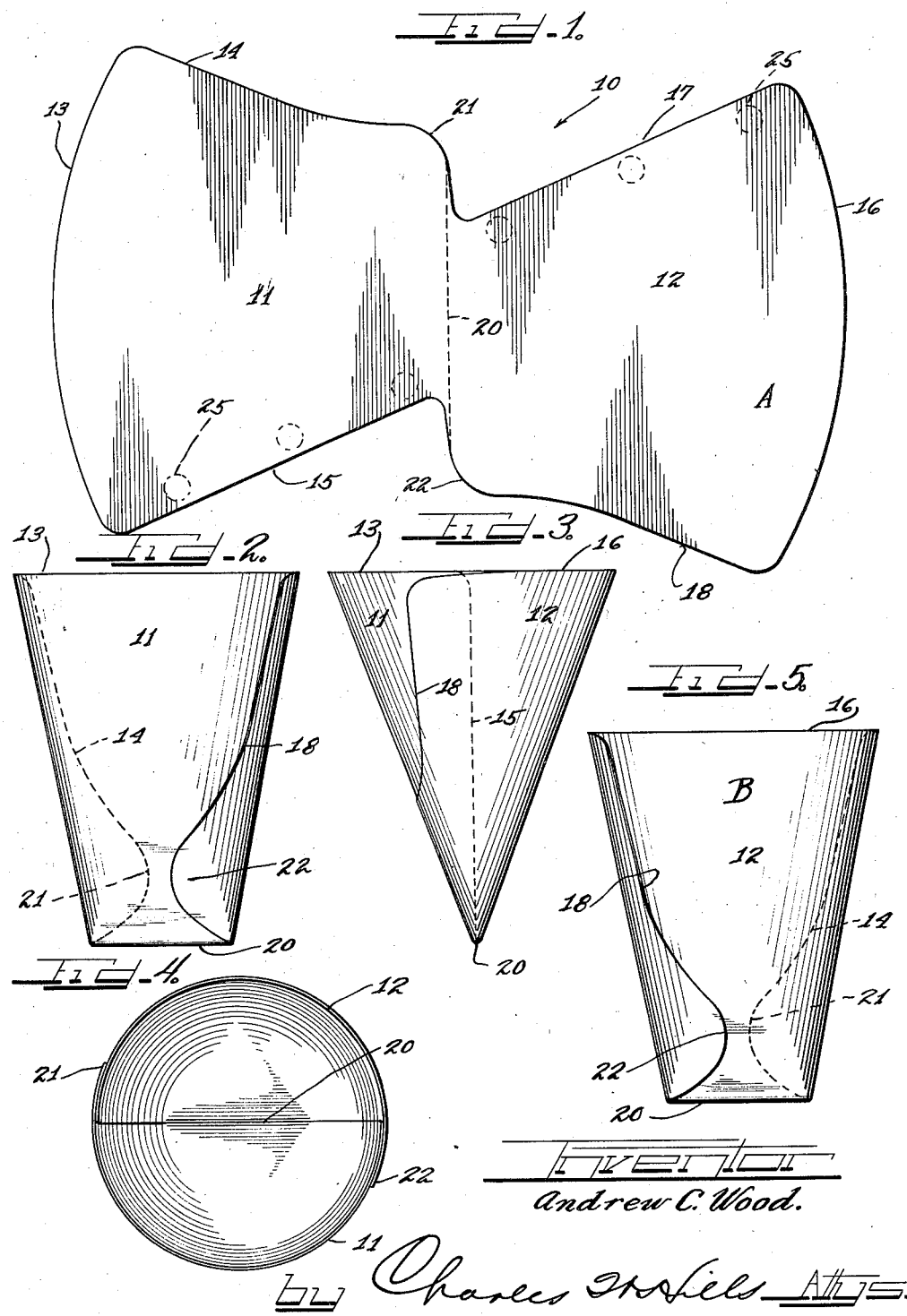

Jan. 14, 1936.    A. C. WOOD    2,027,802
PAPER ICE CREAM CUP
Filed June 26, 1933    3 Sheets-Sheet 2
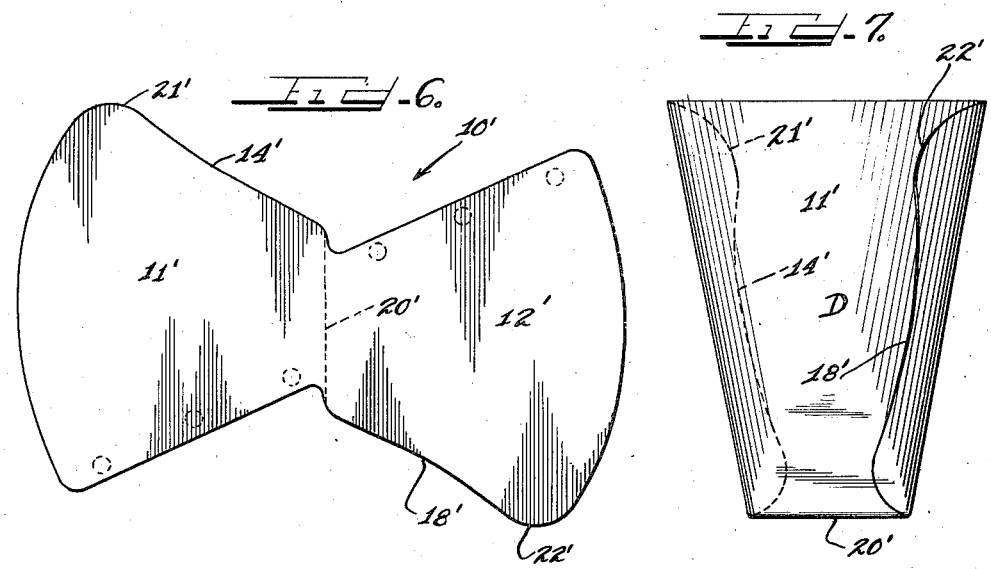
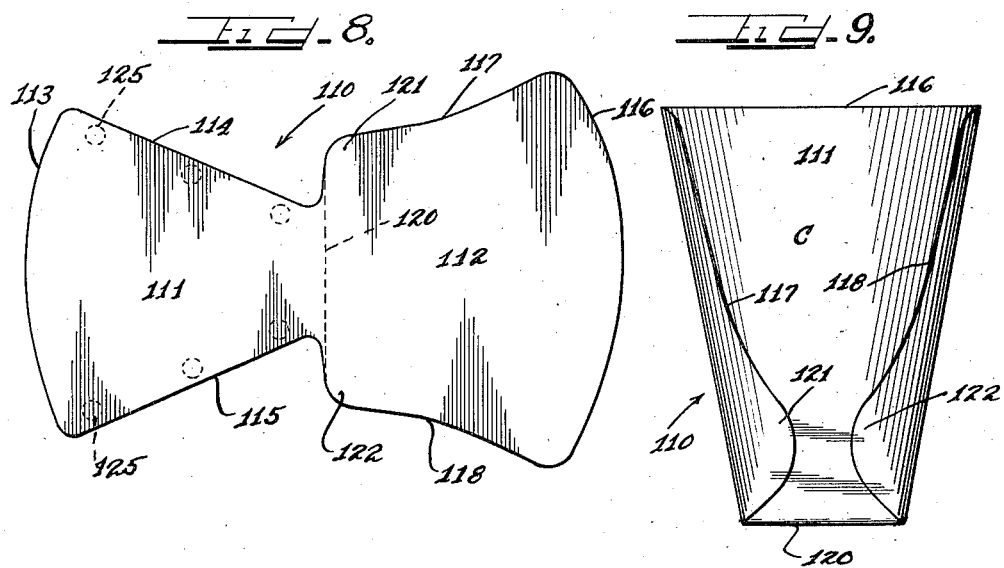
Inventor
Andrew C. Wood.
by Charles H. Niels Attys.

Jan. 14, 1936.  A. C. WOOD  2,027,802
PAPER ICE CREAM CUP
Filed June 26, 1933  3 Sheets-Sheet 3
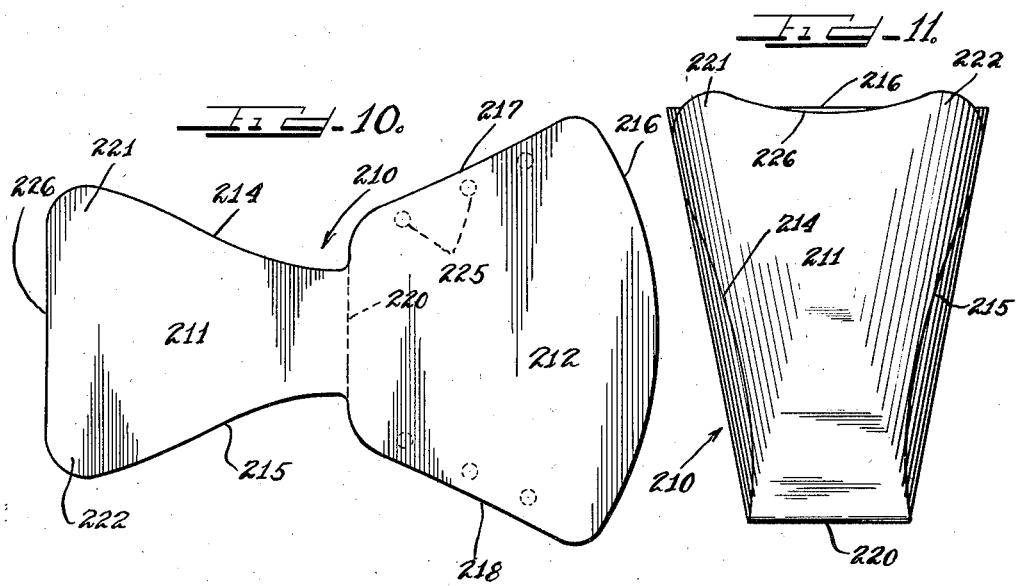
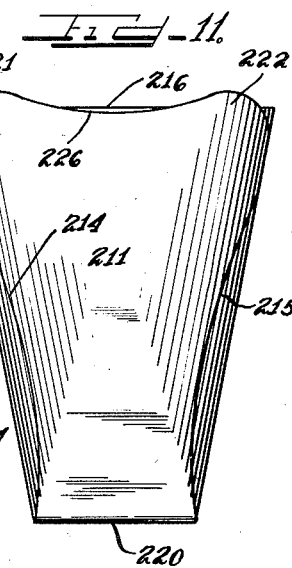
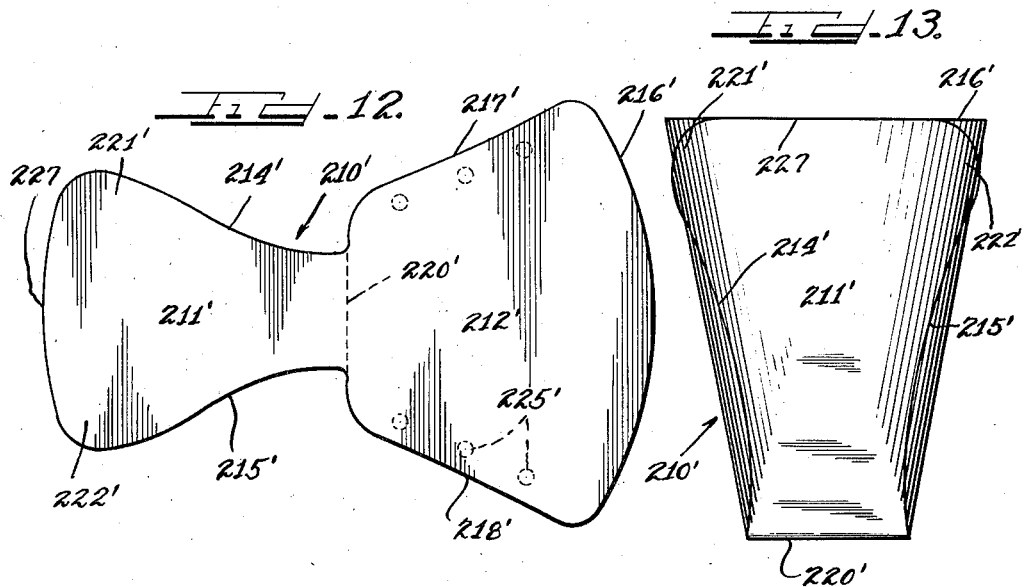
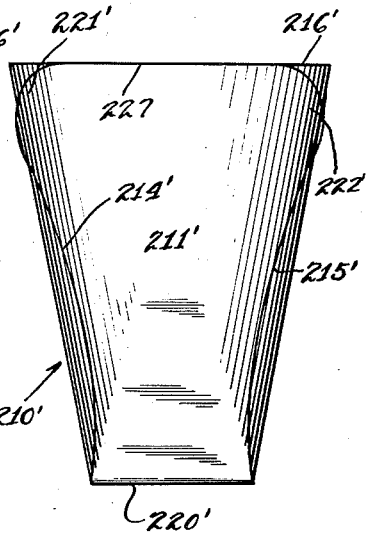
Inventor
Andrew C. Wood.

Patented Jan. 14, 1936

2,027,802

UNITED STATES PATENT OFFICE 2,027,802

PAPER ICE CREAM CUP

Andrew C. Wood, Chicago, Ill., assignor to Vortex Cup Company, Chicago, Ill., a corporation of Delaware Application June 26, 1933, Serial No. 677,662

1 Claim. (Cl. 229—1.5)

This invention relates to cups made of paper and the like and more particularly to paper cups adapted to hold a frozen confection, such as ice cream and the like.

It is an object of the present invention to provide a paper cup adapted to receive a frozen confection and which has one or more tear tabs by means of which the cup may be stripped from the frozen confection by the consumer.

Another object of this invention is to provide a cup, made from a blank having opposite side wall portions, folded about an intermediate transverse line of fold, with their edges cemented together, with means whereby the cup may be readily stripped from a frozen confection therein.

In accordance with the general features of this invention, there is provided several forms of cups of the above-noted character, each of which is made from a blank having oppositely disposed side wall portions, folded about an intermediate transverse line of fold, with their edges cemented together; one or more of the edges being provided with an extension or tab by means of which the cup may be stripped from a frozen confectionary mass.

In accordance with still other features of this invention there is provided a cup of the aforesaid characteristics which has a naturally extended open form with a rounded open mouth tapering in wedge-like form to a transverse bottom line of fold, the cup being secured together only along its edges diverging from its line of fold and one or more of these edges is provided with an extension adapted to be used in readily stripping the cup from a frozen confection.

Other objects and features of this invention will more fully appear from the following detailed description taken in connection with the accompanying drawings which illustrate several embodiments thereof, and in which—

Figure 1 is a view of a blank for making one form of cup embodying my invention.

Figure 2 is a side view of a cup made from the blank shown in Figure 1.

Figure 3 is another side view of the same cup.

Figure 4 is a plan view of the cup shown in Figures 2 and 3.

Figure 5 is a view similar to Figure 2 showing a slight modification of the cup illustrated in the previous figures, the cup being made from the same blank.

Figure 6 is a view of a blank for making another form of cup embodying the features of my invention.

Figure 7 is an enlarged side view of a cup made from the blank shown in Figure 6.

Figure 8 is a view of a blank for making still another form of cup embodying my invention.

Figure 9 is an enlarged side view of a cup made from the blank shown in Figure 8.

Figure 10 is a view of a blank for making a further form of cup embodying principles of my invention.

Figure 11 is an enlarged side view of a cup made from the blank shown in Figure 10.

Figure 12 is a view of a blank for making a still further form of cup embodying principles of my invention.

Figure 13 is an enlarged side view of a cup made from the blank shown in Figure 12.

The reference character 10 designates generally a cup blank having opposite side wall portions 11 and 12 which are slightly offset with reference to each other. The portion 11 has an outer curved edge 13 and inwardly converging side edges 14 and 15. Similarly, the portion 12 has an outer curved edge 16 and inwardly converging side edges 17 and 18.

At the junction of the inner extremities of these inwardly converging side edges there will be found in Figure 1 a dotted line 20 which designates a transverse line of fold about which the portions are folded in the formation of a cup such as that illustrated in Figures 2, 3 and 4, or in Figure 5. It should be noted at this time that if these portions are folded in one direction, a cup such as that shown in Figures 2, 3 and 4 is produced. On the other hand, if these portions are folded in the opposite direction, the shape of the cup will be reversed as shown in Figure 5.

Each of the side edges 14 and 18 is provided, adjacent inner extremities of these side edges, with a slight extension 21—22. These extensions are adapted to serve as stripping tabs whereby the cup may be stripped from a frozen confectionary mass by the consumer.

The marginal portions of the blank adjacent the edges 15 and 17 are provided with cementitious material in the form of dabs of adhesive for securing the side walls 11 and 12 together in the finished cup. These dabs of adhesive are illustrated by dotted circles 25 in Figure 1 and may be applied to either side of the corresponding side wall portions 11—12 depending upon which way the side wall portions 11 and 12 are folded about the transverse line of fold 20.

Needless to say, these dabs of adhesive will be oppositely disposed in the cup shown in Figure 5 from those employed in the cups shown in Figures 2, 3 and 4.

In lieu of applying the adhesive in dabs as indicated at 25, if so desired, a crystallizing glue may be applied along the margins 15 and 17 in strip-like form, either of these methods providing for the ready separation of the cup seams when the cup is stripped from a confection. In other words, the adhesive should only be of such amount and character as to merely hold the cup in shape but at the same time being insufficient to preclude ready separation of the glued surfaces when the blank is stripped from a confection therein, by means of the stripping tabs 21 and 22.

It will be noted in Figures 2 to 5 that the cup formed from the blank has a rounded open mouth which is substantially self-extended and that the body of the cup tapers downwardly from the rounded mouth in wedge-like form to the transverse line of fold 20 or bottom of the cup. The line of fold is of sufficient length to throw substantially the entire body portion of the cup into elliptical section.

Now it will of course be understood that when a consumer desires to strip the cup from the frozen confection therein, such stripping operation may be readily effected by pulling on the opposite stripping tabs 21 and 22 whereby the glued surfaces may be pulled apart.

In Figures 6 and 7 I have illustrated a modification of the cup or blank previously described. The principal difference between this form of the invention and the previously described one resides in the fact that the stripping tabs or extensions 21' and 22' are disposed adjacent the outer extremities of the side edges 14' and 18' of the side wall portions 11' and 12' of the blank 10', instead of adjacent the inner extremities of the side edges as is the case of the previously described form of the invention. This blank 10' as in the case of the blank 10, is folded on a transverse line of fold 20' and the edges thereof are glued together to form the cup illustrated in Figure 7. The assembly and use of this cup is otherwise substantially the same as that of the previously described modification of the invention.

In Figures 8 and 9 there is illustrated a still further form of the invention in which the stripping tabs are both formed on the same side portion of the cup blank. The blank 110 includes oppositely disposed side wall portions 111 and 112 which terminate between the ends of the blank in a transverse line of fold such as that designated by the dotted line 120. The side wall portion 111 includes a curved outer edge 113 and inwardly converging side edges 114 and 115. Similarly, the side wall portion 112 includes an outer curved edge 116 and inwardly converging side edges 117 and 118.

The side portion 112 has the inner extremities of the edges 117 and 118 terminating in stripping extensions or tabs 121 and 122. These stripping tabs 121 and 122 are adapted, in the finished cup as best shown in Figure 9, to be disposed on the same side of the cup.

Either of the two portions 111 and 112 may have its margins adjacent the converging side edges thereof provided with spaced dabs of adhesive, such, for example, as those designated by the dotted circles 125 in Figure 8, or, as stated above, the margins may be striped with crystallizing glue, if so desired.

With the exception of the arrangement of the tabs, the assembly and the use of the cup shown in Figure 9 is substantially the same as that of the previously described forms of the invention and for that reason no further description of the same is thought to be necessary.

In Figures 10 and 11 there is shown another somewhat modified form of the invention. In this instance, a blank 210, somewhat similar in shape to that shown in Figure 8, is formed with oppositely disposed side wall portions 211 and 212, terminating between the ends of a blank in a transverse line of fold as designated by the dotted line 220. The side wall portion 211 includes side edges 214 and 215, converging somewhat arcuately toward the line 220; and the side wall portion 212 includes inwardly converging side edges 217 and 218.

It will be noted that while the side wall portion 212 includes an arcuate outer edge 216, the side wall portion 211 is provided with a substantially straight outer edge 226. The outer edge 226 terminates at each end thereof in an arcuate portion to form stripping tabs 221 and 222. It will be seen that, in this modification, the stripping tabs will fall adjacent the top of the finished cup, and while these stripping tabs are on the same side wall portion of the blank, they are on the opposite wall portion of the blank with respect to the form shown in Figures 8 and 9.

For holding the cup in folded position, adhesive dabs 225 may be provided as shown on the wall portion 212 or may be provided on the portion 211 if so desired. As pointed out hereinabove, if so desired, crystallizing glue may be used in strip form along the respective margins in lieu of the adhesive dabs.

As is the case with the previously discussed modification of this invention, the blank 210 may be folded into cup shape by any suitable cup forming machinery. It will be noted that the wall portion 211 is cut of such a size that the stripping tabs 221 and 222 will project above the general upper periphery of the cup after the blank has been folded on the line 220, whereby, when it is desired to strip the cup from the frozen confectionary mass, access may be had to the stripping tabs from the top of the frozen mass and cup unit. It will also be seen that, while, when the blank is in flat position, the edge 226 is substantially straight, when the blank is folded into a cup having a substantially circular top, the edge 226 arcs downwardly below the opposite edge 216 on the other wall portion of the cup, thereby adding to the facility with which the stripping tabs may be grasped by a consumer.

The assembly of the cup shown in Figure 11 is slightly different from that of the previously described modifications, in that the wall portion 211 overlies both of the margins adjacent the side edges 217 and 218 of the wall portion 212. With this difference of assembly and the different location of the stripping tabs, the ultimate use of the cup shown in Figure 11 is substantially the same as that previously described.

In Figures 12 and 13 still another embodiment of the present invention is illustrated, this embodiment being similar in many details to that shown in Figures 10 and 11. The blank shown in Figure 12 has similar wall portions, the same line of fold, the same side edges on the wall portions, and the adhesive or glue may be applied in similar fashion as in the blank shown in Figure 10.

The principal difference between the blank 210' and the blank 210 resides in the fact that the wall portion 211' is provided with an outer arcuate edge 227 which terminates at its ends in rounded portions to form the stripping tabs 221' and 222'. When the blank is folded into cup form, as hereinabove described, the outer edge 227 falls even with the outer edge 216' of the opposite wall portion 212' so that the upper circular periphery of the finished cup is substantially smooth.

In this instance, however, the cup formed from the blank 210' has the stripping tabs 221' and 222' adjacent the top and on the same side wall but accessible from the sides of the cup, these tabs having their side edges projecting outwardly substantially laterally without following the contour of the cup, as best seen in Figure 13.

From the foregoing, it will be apparent that I have provided a simple cup forming blank in which there is only one line of fold, and which blank may be readily formed into cup shape by any suitable cup forming machinery in a very simplified manner, it being only necessary to fold the blank along one line and unite the side walls by a simple cementing operation. In addition, it will be noted that the cup may be readily stripped from a frozen confectionary mass contained therein, the cup being highly suitable for the purposes designed, and economical to manufacture.

Now I desire it understood that although I have illustrated and described in detail the preferred embodiments of this invention, the invention is not to be thus limited, but only insofar as defined by the scope and spirit of the appended claim.

I claim as my invention:

As an article of manufacture, a cup adapted to contain a frozen confection and arranged to be subsequently stripped from its contents, said cup being formed from a blank comprising a single sheet cut to provide a pair of opposed sector-shaped side walls having inwardly converging edges and joined at their narrow portions, said blank being folded about a single transverse line of fold and having overlapped marginal portions on opposite sides of the cup secured together by adhesive of such amount and character as merely to hold the cup in shape but being insufficient to preclude ready separation of the side edges when the blank is stripped from the confection therein, and a plurality of stripping tabs extending freely from opposite secured portions of the cup and by means of which said cup may be stripped from its contents by pulling said tabs in opposite directions away from the cup body.

ANDREW C. WOOD.